United States Patent [19]

Endo et al.

[11] 4,208,391
[45] Jun. 17, 1980

[54] PROCESS FOR PRODUCING AQUEOUS SOLUTION OF CALCIUM NITRITE

[75] Inventors: Makoto Endo; Kohji Kusahara, Fuchumachi, Japan

[73] Assignee: Nissan Chemical Industries, Limited, Tokyo, Japan

[21] Appl. No.: 933,582

[22] Filed: Aug. 14, 1978

[30] Foreign Application Priority Data

Sep. 13, 1977 [JP] Japan ............................. 52-110136

[51] Int. Cl.² ............................................. C01B 21/20
[52] U.S. Cl. ..................................... 423/385; 423/235
[58] Field of Search ................................ 423/385, 235

[56] References Cited

U.S. PATENT DOCUMENTS 4,009,246  2/1977  Wendel .............................. 423/385

FOREIGN PATENT DOCUMENTS 3623303 of 1971 Japan .......................................... 423/385
10479 of 1912 United Kingdom ....................... 423/385

*Primary Examiner*—O. R. Vertiz
*Assistant Examiner*—Wayne A. Langel

*Attorney, Agent, or Firm*—Oblon, Fisher, Spivak, McClelland & Maier

[57] ABSTRACT

An aqueous solution of calcium nitrite having high purity and high concentration is obtained by contacting a nitrogen oxides containing gas with an aqueous slurry of calcium hydroxide.

It is necessary to use the aqueous slurry having high calcium hydroxide content such as 20 to 40 wt. %, whereby it is necessary to feed the gas having high nitrogen oxides concentration such as 5 to 10 vol. % to give high conversion to calcium nitrite. In order to prevent a formation of a by-product of calcium nitrate, a nitrogen oxides containing gas having 5 to 10 vol. % of a nitrogen oxides concentration and 1.2 to 1.5 of a molar ratio of $NO/NO_2$ is fed as a first stage and then, the unabsorbed gas is oxidized and the resulting gas having 1 to 3 vol. % of a nitrogen oxides concentration and 1.2 to 1.5 of molar ratio of $NO/NO_2$ is fed to the aqueous slurry having 3 to 10 wt. % of a calcium hydroxide obtained in the first stage so as to convert the residual calcium hydroxide to calcium nitrite without forming a by-product of calcium nitrate. The process is preferably carried out as continuous process having a first reaction zone and a second reaction zone.

6 Claims, No Drawings

PROCESS FOR PRODUCING AQUEOUS SOLUTION OF CALCIUM NITRITE

BACKGROUND OF THE INVENTION

1. FIELD OF THE INVENTION

The present invention relates to an improved process for producing an aqueous solution of calcium nitrite by contacting a nitrogen oxides containing gas which contains NO and $NO_2$ with an aqueous slurry of calcium hydroxide to absorb the gas.

2. DESCRIPTION OF THE PRIOR ART

Heretofore, calcium nitrite has been used as an anticorrosive agent and an additive for a cement etc. In industrial usages, calcium nitrite is preferably used in a form of an aqueous solution rather than a solid form, and especially in a form of an aqueous solution having about 30 to 40 wt.% of calcium nitrite.

The aqueous solution of calcium nitrite can be easily obtained by dissolving a solid calcium nitrite into water. The commercially available solid calcium nitrite is obtained by concentrating and drying an aqueous solution of calcium nitrite and accordingly, the method of dissolving the solid calcium nitrite is in remarkably low efficiency.

It has been proposed to produce an aqueous solution of calcium nitrite in Japanese Patent Publication No. 35596/1976. However, the known process requires many complicated steps such as a filtration, an aging, a concentration, a second filtration, and a second concentration, etc. to be low efficiency and to give large loss of the starting materials of a nitrogen oxides gas and an aqueous slurry of calcium hydroxide, disadvantageously.

The inventors have studied to attain a process for producing an aqueous solution of calcium nitrite having high purity and high concentration from a nitrogen oxides containing gas and an aqueous slurry of calcium hydroxide, and have found the fact that a formation of a by-product of calcium nitrate can be prevented by contacting a gas having less than about 3 vol.% of a nitrogen oxides concentration with an aqueous slurry having 3 to 10 wt.% of a calcium hydroxide content and containing calcium nitrite to absorb it whereby calcium nitrite is produced at high efficiency. The present invention has been attained by the finding.

SUMMARY OF THE INVENTION

It is an object of the present invention to provide a process for producing an aqueous solution of calcium nitrite having high purity and high concentration of 30 to 40 wt.% in high conversion of greater than 95%.

It is another object of the present invention to provide a process for producing an aqueous solution of calcium nitrite having high purity and high concentration in high efficiency by combining simple steps from an aqueous slurry of calcium hydroxide and a nitrogen oxides containing gas.

It is the other object of the present invention to provide a process for producing an aqueous solution of calcium nitrite having high purity and high concentration in high efficiency under as condition reducing loss of calcium hydroxide and nitrogen oxides gas.

The foregoing and other objects of the present invention have been attained by providing a process for producing an aqueous solution of calcium nitrite by (1) a step of contacting a nitrogen oxides containing gas having 5 to 10 vol.% of a nitrogen oxides concentration and 1.2 to 1.5 of a molar ratio of $NO/NO_2$ with an aqueous slurry having 20 to 40 wt.% of a calcium hydroxide content at 40° to 70° C. until reducing the calcium hydroxide content in a range of 3 to 10 wt.% as a first stage and (2) a step of separating the unabsorbed and unreacted gas and oxidizing the separated gas to form a gas having 1 to 3 vol.% of a nitrogen oxides concentration and 1.2 to 1.5 of a molar ratio of $NO/NO_2$ and (3) a step of contacting the resulting gas having low nitrogen oxides concentration with the separated aqueous slurry having 3 to 10 wt.% of a calcium hydroxide content and containing calcium nitrite at 40° to 70° C. to reduce the calcium hydroxide content to be less than 3 wt.% as a second stage and (4) a step of filtering the resulting solution having high calcium nitrite concentration.

DETAILED DESCRIPTION OF THE PREFERRED EMBODIMENTS

The first feature of the present invention is to react the aqueous slurry of calcium hydroxide with nitrogen oxides gas in two stages as the step (1) and the step (3), under different concentrations.

The second feature of the present invention is to reduce loss of calcium hydroxide and nitrogen oxide in the step (2) and the step (3).

The third feature of the present invention is to combine the steps (1), (2), (3) and (4), whereby the formation of a by-product of calcium nitrate is reduced and the conversion to calcium nitrite is increased to be greater than 95% to obtain an aqueous solution of calcium nitrite having high purity and high concentration in high efficiency.

In the process of the present invention, the conversion to calcium nitrite is given by a ratio of calcium nitrite to total of calcium nitrite and calcium nitrate.

The aqueous slurry of calcium hydroxide having high calcium hydroxide content can be easily obtained by dispersing a commercially available calcium hydroxide such as slaked lime into water.

When the calcium hydroxide content is less than 20 wt.%, the aqueous solution of calcium nitrite having high concentration as the object product of the present invention can not be obtained, even though the steps (1), (2), (3) and (4) are combined.

When the calcium hydroxide content is greater than 40 wt.%, a viscosity of the slurry of the reaction mixture in the step (1) is too high because of a formation of a complex whereby the absorption of nitrogen oxides gas can not be smoothly performed. Moreover, calcium nitrite is precipitated disadvantageously.

The gas having high nitrogen oxides concentration used in the present invention can be easily obtained by oxidizing ammonia with air. It is important to give 1.2 to 1.5 of a molar ratio of $NO/NO_2$.

When the molar ratio of $NO/NO_2$ is less than 1.2, the formation of the by-product of calcium nitrate is increased in the step (1) of contacting it with the aqueous slurry of calcium hydroxide to absorb it, whereby an aqueous solution of calcium nitrite having high concentration can not be obtained.

When the molar ratio of $NO/NO_2$ is greater than 1.5, the conversion of nitrogen oxides in the step (1) is decreased whereby an efficiency of the reaction becomes low.

It is not sufficient, however only to define the molar ratio of $NO/NO_2$ as the nitrogen oxides containing gas used in the step (1) and it is preferable to define the nitrogen oxides concentration in the gas to the specific range.

When the nitrogen oxides concentration is lower than about 5 vol.%, the conversion is decreased to be uneconomical from the viewpoint of the apparatus coefficiency.

When the nitrogen oxides concentration is higher, there is no trouble. However, it is preferable to obtain a nitrogen oxides containing gas having lower than 10 vol.% of a nitrogen oxides concentration by oxidizing ammonia in an industrial operation.

It is preferable to use the nitrogen oxides containing gas having high concentration but lower than 10 vol.% in the step (1) of the process of the present invention.

In the process of the present invention, it is necessary to maintain the temperature of the aqueous slurry at 40° to 70° C. in the step (1) contacting the nitrogen oxides containing gas with the aqueous slurry of calcium hydroxide.

When the temperature is lower than 40° C., a basic calcium nitrite $Ca(NO_2)_2.Ca(OH)_2.2H_2O$ (hereinafter referring as complex) is precipitated by a reaction of the resulting calcium nitrite with the unreacted calcium hydroxide, whereby the reaction for producing calcium nitrite is not smoothly performed.

When the temperature is high, the formation of the complex can be prevented. However, the steam partial pressure of the aqueous slurry is higher than steam partial pressure of the nitrogen oxides containing gas at higher than 70° C., whereby the phenomenon of the concentration of the aqueous slurry is caused and the reaction contacting and absorbing nitrogen oxides gas is not smoothly performed.

In the process of the present invention, it is necessary to separate the nitrogen oxides containing gas from the reaction mixture in the step (1) when the residual calcium hydroxide content is reduced in a range of 3 to 10 wt.% to stop the reaction.

When the residual calcium hydroxide content is greater than 10 wt.%, it takes a long time for the reaction in the step (3) to cause a low conversion even though a large volume of the nitrogen oxides containing gas having low concentration is contacted with the reaction mixture.

When the reaction is reached to be less than 3 wt.% of the residual calcium hydroxide content, the formation of the by-product of calcium nitrate is increased in the step (1), whereby it is difficult to obtain an aqueous solution of calcium nitrite having high purity.

Thus, an aqueous solution of calcium nitrite can be obtained in high efficiency and high processibility under preventing the formation of the by-product of calcium nitrate and the precipitation of the complex in the step (1). However, the resulting slurry of the reaction mixture in the step (1) contains 3 to 10 wt.% of calcium hydroxide. Accordingly, if the residual calcium hydroxide is separated from the aqueous slurry, loss of calcium hydroxide is caused and moreover, a concentration step is required for obtaining an aqueous solution of calcium nitrite having high concentration, whereby the simple process can not be attained.

In the process of the present invention, the aqueous slurry of the reaction mixture containing calcium nitrite and having low calcium hydroxide content obtained in the step (1) is further contacted with a nitrogen oxides containing gas in the step (3) so as to overcome the above-mentioned disadvantages.

It is necessary, however to define a nitrogen oxides concentration in the nitrogen oxides containing gas used in the step (3).

As stated above, the inventors have studied and found the fact that when a nitrogen oxides containing gas is absorbed into an aqueous slurry having 3 to 10 wt.% of a calcium hydroxide content and containing the resulting calcium nitrite, the formation of the by-product of calcium nitrate is increased depending upon the increase of a nitrogen oxide concentration in the nitrogen oxides containing gas whereas the formation of the by-product of calcium nitrate is decreased and calcium nitrite is produced in high efficiency depending upon the decrease of a nitrogen oxide concentration. The nitrogen oxides concentration in the gas used in the step (3) is preferably lower than 3 vol.%. However, it is also not preferable to be too low concentration, because of slow speed of the production of calcium nitrite. It is suitable to be 1 to 3 vol.% of the nitrogen oxides concentration.

The molar ratio of $NO/NO_2$ in the gas having a low nitrogen oxides concentration used in the step (3) is preferably in a range of 1.2 to 1.5 on the same reason of the step (1).

The temperature of the slurry in the step (3) is preferably in a range of 40° to 70° C. on the same reason of the step (1).

In the step (3), calcium hydroxide is converted to calcium nitrite. In order to completely convert all of calcium hydroxide, it takes a long time to be unefficient as an industrial process. When nitrogen oxides gas is fed into a slurry having low concentration of calcium hydroxide for a long time, a by-product of calcium nitrate tends to be produced by reacting nitrogen oxides gas with the resulting calcium nitrite.

It is effective to stop the reaction under the condition remaining less than 3 wt.% preferably about 1 wt.% of calcium hydroxide in the reaction mixture obtained in the step (3).

The loss of nitrogen oxides can be prevented by utilizing a discharge gas containing unabsorbed nitrogen oxides discharged from the step (1), as the gas having a low nitrogen oxides concentration used in the step (3).

The step (2) is provided for this purpose.

The molar ratio of $NO/NO_2$ in the discharge gas which is not absorbed in the step (1) is usually higher than about 4. In order to control the molar ratio of $NO/NO_2$ in a range of 1.2 to 1.5, it is necessary to oxidize the unabsorbed discharge gas.

The oxidation can be easily carried out by using an oxidizing tower with 4 to 5 vol.% of oxygen contained in the unabsorbed discharge gas.

The oxidation can be easily performed by retaining the unabsorbed discharge gas in the oxidizing tower for a satisfactory time.

The concentration of nitrogen oxides can be easily attained by feeding nitrogen gas as desired. However, when a gas having 5 to 10 vol.% of a nitrogen oxides concentration is used as the gas having high nitrogen oxide concentration in the step (1), the nitrogen oxides concentration in the unabsorbed discharge gas in the step (1) is in a range of about 1 to 3 vol.% whereby the discharge gas can be used without a specific controlling treatment.

In accordance with the process of the present invention combining the steps (1), (2) and (3), an aqueous solution having high calcium nitrite concentration can be obtained. However, the solution obtained in the step (3) contains a small amount of calcium hydroxide and insoluble impurities included in the starting materials. These insoluble materials are separated to obtain the aqueous solution of calcium nitrite having high purity and high concentration.

The solution obtained in the step (3) can be easily filtered whereby it is preferable to provide a filtering step as the step (4) for separating the insoluble impurities.

The process of the present invention can be a batch system and a semi-continuous system and a continuous system.

In a batch system, two large reactors are used in the first reactor, the first stage of conversion of calcium hydroxide to calcium nitrite is performed and then in the second reactor, the unabsorbed discharge gas is fed to perform the second stage. Since the calcium hydroxide content in the first reactor is varied in the batch system, the balance of the reactions is not suitable.

Accordingly, it is preferable to use the continuous process.

Since it takes a long time for converting calcium hydroxide with nitrogen oxides to calcium nitrite, it is preferable to use two or more reactors in the continuous process, as follows, though a pipe line continuous process reacting through two pipe systems can be used, if desirable.

In the first reactor, the aqueous slurry of calcium hydroxide is fed from the upper part and the nitrogen oxides containing gas is fed from the lower part and the reaction mixture is discharged from the bottom.

The unabsorbed discharge gas can be separated in the reactor.

In the second reactor, the reaction mixture is fed from the upper part and the gas having low nitrogen oxides concentration is fed from the lower part and the reaction mixture is discharged from the bottom.

This continuous process can be shown as follows.

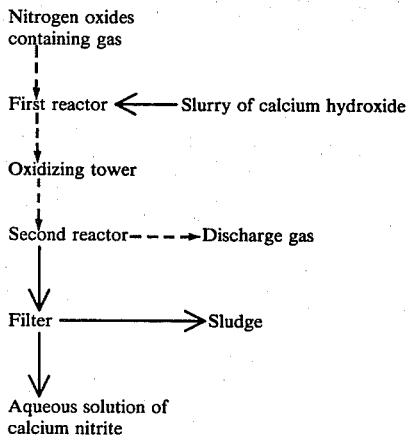

In said continuous system, the aqueous slurry having high calcium hydroxide content (20 to 40 wt.%) is continuously charged from the top and the gas having high nitrogen oxides concentration is continuously fed from the bottom of the first reactor under maintaining the calcium hydroxide content in a range of 3 to 10 wt.% to absorb the nitrogen oxide containing gas into the aqueous slurry of calcium hydroxide to react them. The reaction mixture is continuously transferred to the second reactor.

On the other hand, the unabsorbed nitrogen oxides containing gas discharged from the first reactor is continuously fed to the oxidizing tower to oxidize nitrogen oxides to control the molar ratio of $NO/NO_2$. The resulting gas is continuously fed from the bottom of the second reactor to contact with the reaction mixture transferred from the first reactor to the second reactor. The resulting solution is discharged from the bottom and is fed to the filter to filtrate it whereby the aqueous solution of calcium nitrite having high purity and high concentration can be continuously obtained.

In the other embodiment, the unabsorbed nitrogen oxides containing gas discharged in the step (3) is recovered and it is fed to the step (2') for controlling the molar ratio of $NO/NO_2$ and if necessary the concentration of nitrogen oxides as the step (2). The reaction mixture obtained in the step (3) is contacted with the gas having low nitrogen oxides concentration obtained in the step (2') to absorb the nitrogen oxides in the step (3') and the solution obtained in the step (3') is filtered.

As the same manner, multi-steps(2'') (2''') . . . and (3'') (3''') . . . can be added to perform the reaction of nitrogen oxides in the absorption until decreasing the calcium hydroxide content to less than 3 wt.%.

In the process of the present invention, the multi-steps can be combined, however, it is optimum to combine the steps (1), (2), (3) and (4) in said simple manner, in order to carry out the process in high efficiency on the apparatus.

Thus, in accordance with the process of the present invention, the steps (1), (2), (3) and (4) are combined to obtain the aqueous solution of calcium nitrite having higher than 95 wt.% of a calcium nitrite concentration and having high purity in a yield of greater than 95%. This aqueous solution can be used as anticorrosive agent and additive for cement without any treatment.

A further understanding can be attained by reference to certain specific examples which are provided herein for purposes of illustration only and are not intended to be limiting in any manner, unless otherwise specified.

EXAMPLE 1

In a first reactor having 1.2 m of a diameter and 2.0 m of a height, 300 Kg of slaked lime (1st grade) and 800 Kg of water were charged to prepare a slurry.

A gas having 9.4 vol.% of nitrogen oxides and having 1.3 of a molar ratio of $NO/NO_2$ is prepared by oxidizing ammonia, and the gas at 170° C. was fed through a nozzle having many holes equipped at the bottom of the first reactor under stirring the slurry at 200 Nm³/h of a feeding rate for 9.5 hours. During the reaction, the reaction mixture was cooled to keep at 50° to 60° C. and pH of the reaction mixture was maintained at higher than 11. Thus, 1.4 tone of the reaction mixture having 29.9 wt.% of calcium nitrite, 1.0 wt.% of calcium nitrate and 3.2 wt.% of calcium hydroxide was obtained. During the reaction, the nitrogen oxides concentration of the gas discharged from the first reactor was about 1.5 vol.%.

The reaction mixture was transferred from the first reactor to the second reactor.

The gas containing about 1.5 vol.% of nitrogen oxides discharged from the first reactor was fed to an oxidizing tower to control a molar ratio of $NO/NO_2$ to about 1.4. The resulting gas was fed through a nozzle having many holes equipped at the bottom of the second reactor to react them at 50° to 60° C. and pH of higher than 11 for 9.5 hours. As the result, 1.4 tones of the reaction mixture containing 33.5 wt.% of calcium nitrate, 1.1 wt.% of calcium nitrate, 0.7 wt.% of calcium hydroxide and 5.9 wt.% of the other solid components was obtained. The nitrogen oxides concentration in the discharge gas was 0.3 vol.%.

The reaction mixture was filtered to obtain a transparent aqueous solution of calcium nitrite containing 35.0 wt.% of calcium nitrite and 1.2 wt.% of calcium nitrate.

EXAMPLE 2

In the first reactor containing an aqueous slurry having 28.8 wt.% of calcium nitrite and 4 wt.% of slaked lime, an aqueous slurry having 25.8 wt.% of slaked lime was continuously fed at a rate of 129 Kg/hour and a gas having 9.5 vol.% of nitrogen oxides concentration and 1.2 of a molar ratio of $NO/NO_2$ at 170° to 180° C. obtained by oxidizing ammonia was continuously fed at a rate of 200 $Nm^3$/hour under stirring the mixture. The reaction temperature was kept at 50° to 55° C. and the reaction mixture was continuously discharged from the first reactor at a rate of 166 Kg/hour, whereby an average residence time was kept in 13 hours and a content of the unreacted slaked lime was kept in 4 wt.%. From the first reactor, the unreacted gas was continuously discharged at a rate of 172 $Nm^3$/hour and it was fed to an oxidizing tower wherein the gas was oxidized at 60° to 80° C. to obtain a gas having 1.5 vol.% of nitrogen oxides content and 1.3 of a molar ratio of $NO/NO_2$.

The slurry containing 4 wt.% of slaked lime discharged from the first reactor, was continuously fed to the second reactor at the same rate. On the other hand, the resulting nitrogen oxides gas was continuously fed at a rate of 172 $Nm^3$/hour.

In the second reactor, the reaction was performed at 55° to 60° C. and the reaction mixture was discharged at a rate of 169 Kg/hour whereby an average residence time was kept in 13 hours. The unreacted gas containing 0.3 vol.% of nitrogen oxides was discharged at a rate of 172 $Nm^3$/hour whereby the content of the slaked lime remained in the second reactor was kept in 1 wt.%. The slurry discharged from the second reactor was continuously fed to a filter to filtrate it where a clean aqueous solution containing 33.5 wt.% of calcium nitrite and 1.1 wt.% of calcium nitrate and no slaked lime was continuously obtained.

What is claimed is:

1. In a process for producing an aqueous solution of calcium nitrite having high purity and high concentration by contacting a nitrogen oxides containing gas with an aqueous slurry of calcium hydroxide, the improvement wherein a gas having a temperature of 170°–180° C. and having a nitrogen oxide concentration of 5 to 10 vol.% and a molar ratio of $NO/NO_2$ of 1.2 to 1.5 is contacted with the aqueous slurry having 20 to 40 wt.% of a calcium hydroxide content at 40° to 70° C. until the calcium hydroxide content is reduced to a range of 3 to 6 wt.% as a first stage; and the unabsorbed and unreacted gas is separated and the gas is oxidized at 60°–80° C. to form a gas having a nitrogen oxides concentration of 1 to 3 vol.% and a molar ratio $NO/NO_2$ of 1.2 to 1.5 and the resulting gas is contacted with the aqueous slurry separated from the first stage and having 3 to 6 wt.% of a calcium hydroxide content and containing calcium nitrite, at 40° to 70° C. to reduce the calcium hydroxide content to less than 3 wt.% as a second stage and filtering the resulting solution.

2. A process for producing an aqueous solution of calcium nitrite according to claim 1 wherein the nitrogen oxides containing gas used in the first stage is obtained by oxidizing ammonia.

3. A process for producing an aqueous solution of calcium nitrite according to any of claims 1 or 2 wherein the calcium hydroxide content of the aqueous solution obtained in the second stage is less than 1 wt.%.

4. A process for producing an aqueous solution of calcium nitrite according to any of claims 1 or 2 wherein calcium hydroxide as the starting material which is used in the first stage is a slaked lime.

5. A continuous process for producing an aqueous solution of calcium nitrite having high purity and high concentration by contacting a nitrogen oxides containing gas with an aqueous slurry of calcium hydroxide, which comprises (a) feeding continuously an aqueous slurry having 20 to 40 wt.% of slaked lime content and a nitrogen oxide containing gas having a temperature of 170°–180° C. and having a nitrogen oxides concentration of 5 to 10 vol.% and a molar ratio of $NO/NO_2$ of 1.2 to 1.5 obtained by oxidizing ammonia into a first reaction zone to contact them under conditions of temperature of 40° to 70° C. until the calcium hydroxide content is reduced to a range of 3 to 6 wt.%;

(b) discharging continuously the unabsorbed gas and the reaction mixture from the first reaction zone and separating and feeding continuously the reaction mixture to a second reaction zone and feeding continuously the unabsorbed gas into an oxidizing device;

(c) oxidizing the unabsorbed gas in the oxidizing device at 60°–80° C. to control it to a nitrogen oxides concentration of 1 to 3 vol.% and a molar ratio of $NO/NO_2$ of 1.2 to 1.5, and feeding the resulting gas into the second reaction zone;

(d) contacting continuously the resulting gas with the aqueous slurry separated from the first reaction zone and having 3 to 6 wt.% of a calcium hydroxide content under conditions of temperature of 40° to 70° C. to reduce the calcium hydroxide content in the second reaction zone to less than 3 wt.%; and (e) discharging continuously the unabsorbed gas and the reaction mixture from the second reaction zone while separating and feeding continuously the reaction mixture to a filter to separate the remaining calcium hydroxide.

6. A process for producing an aqueous solution of calcium nitrite according to claim 5 wherein the calcium hydroxide content in the reaction mixture obtained in the second reaction zone is less than 1 wt.%.

* * * * *